US012776538B2

(12) United States Patent
Wei et al.

(10) Patent No.: US 12,776,538 B2
(45) **Date of Patent: *Oct. 27, 2026**

(54) BATTERY AND ELECTRONIC DEVICE

(71) Applicant: Zhuhai CosMX Battery Co., Ltd., Zhuhai (CN)

(72) Inventors: Zhida Wei, Zhuhai (CN); Ning Peng, Zhuhai (CN); Yanming Xu, Zhuhai (CN)

(73) Assignee: ZHUHAI COSMX BATTERY CO., LTD., Guangdong (CN)

( * ) Notice: Subject to any disclaimer, the term of this patent is extended or adjusted under 35 U.S.C. 154(b) by 471 days.

This patent is subject to a terminal disclaimer.

(21) Appl. No.: 18/523,850

(22) Filed: Nov. 29, 2023

(65) Prior Publication Data

US 2024/0097252 A1 Mar. 21, 2024

Related U.S. Application Data

(63) Continuation of application No. PCT/CN2022/118606, filed on Sep. 14, 2022.

(30) Foreign Application Priority Data

Sep. 18, 2021 (CN) ......................... 202111112950.X

(51) Int. Cl.
*H01M 50/186* (2021.01)
*H01M 50/109* (2021.01)
(Continued)

(52) U.S. Cl.
CPC ....... *H01M 50/186* (2021.01); *H01M 50/109* (2021.01); *H01M 50/153* (2021.01);
(Continued)

(58) Field of Classification Search
CPC ............. H01M 50/186; H01M 50/109; H01M 50/153; H01M 50/184; H01M 50/198;
(Continued)

(56) References Cited

U.S. PATENT DOCUMENTS

2019/0348702 A1* 11/2019 Zhu .................. H01M 10/0427
2021/0399389 A1* 12/2021 Ko ...................... H01M 50/153
(Continued)

FOREIGN PATENT DOCUMENTS

CN 107768586 A 3/2018
CN 207097877 U 3/2018
(Continued)

OTHER PUBLICATIONS

The State Intellectual Property Office of People's Republic of China, "First Office Action" in Application No. 202111112950.X, Nov. 7, 2024, 21 pages.
(Continued)

*Primary Examiner* — Jennifer Dieterle
(74) *Attorney, Agent, or Firm* — Davis Wright Tremaine LLP

(57) ABSTRACT

The present application provides a battery and an electronic device. The battery includes an electrode assembly, a lower casing, a first conductive part, and a second conductive part. An opening is provided at a top of the lower casing; the second conductive part covers the opening of the lower casing; the second conductive part and the lower casing define an accommodating cavity; the electrode assembly is located in the accommodating cavity; the first conductive part is connected to a side of the second conductive part facing the accommodating cavity; a sealing layer is provided between the first conductive part and the second conductive part to insulate the two conductive parts; a through hole is formed on the second conductive part; and at least part of a
(Continued)

structure of the first conductive part is exposed out of the accommodating cavity via the through hole.

19 Claims, 4 Drawing Sheets

(51) Int. Cl.

| | |
|---|---|
| ***H01M 50/153*** | (2021.01) |
| ***H01M 50/184*** | (2021.01) |
| ***H01M 50/198*** | (2021.01) |
| ***H01M 50/545*** | (2021.01) |
| ***H01M 50/55*** | (2021.01) |
| ***H01M 50/559*** | (2021.01) |
| ***H01M 50/566*** | (2021.01) |
| ***H01M 50/588*** | (2021.01) |
| ***H01M 50/59*** | (2021.01) |

(52) U.S. Cl.
CPC ....... *H01M 50/184* (2021.01); *H01M 50/198* (2021.01); *H01M 50/545* (2021.01); *H01M 50/55* (2021.01); *H01M 50/559* (2021.01); *H01M 50/566* (2021.01); *H01M 50/588* (2021.01); *H01M 50/59* (2021.01)

(58) Field of Classification Search
CPC .. H01M 50/545; H01M 50/55; H01M 50/559; H01M 50/566; H01M 50/588; H01M 50/59; H01M 50/528; H01M 50/172; H01M 50/188; H01M 50/533; Y02E 60/10
See application file for complete search history.

(56) References Cited

U.S. PATENT DOCUMENTS

2023/0106855 A1* 4/2023 Xie .................... H01M 50/109 429/164
2023/0207776 A1* 6/2023 Liu ........................ H01M 4/13 429/211

FOREIGN PATENT DOCUMENTS

| | | | | |
|---|---|---|---|---|
| CN | 109192889 | A | | 1/2019 |
| CN | 109980155 | A | | 7/2019 |
| CN | 210535698 | U | | 5/2020 |
| CN | 112234282 | A | | 1/2021 |
| CN | 112290131 | A | | 1/2021 |
| CN | 212659599 | U | | 3/2021 |
| CN | 112993452 | A | | 6/2021 |
| CN | 213520130 | | * | 6/2021 |
| CN | 213520130 | U | | 6/2021 |
| CN | 113675508 | A | | 11/2021 |
| CN | 113675512 | A | | 11/2021 |
| CN | 215933705 | U | | 3/2022 |
| JP | 2020119628 | A | | 8/2020 |

OTHER PUBLICATIONS

The State Intellectual Property Office of People's Republic of China, "Rejection Decision" in Application No. 202111112950.X, Mar. 26, 2025, 21 pages.
Notice of Registration received in related Chines Application No. 202111112950X, National Intellectual Property Office, on Jan. 24, 2022, in 4 pages.
International Search Report issued in related International Application No. PCT/CN2022/1186606, on Nov. 29, 2022, in 13 pages.

* cited by examiner

BATTERY AND ELECTRONIC DEVICE

This application is a continuation of International Application No. PCT/CN2022/118606, filed on Sep. 14, 2022, which claims priority to Chinese Patent Application No. 202111112950X, filed on Sep. 18, 2021. The disclosures of the aforementioned applications are hereby incorporated by reference in their entireties.

TECHNICAL FIELD

The present disclosure relates to the field of battery technologies and, in particular, to a battery and an electronic device.

BACKGROUND

With the development of the economy and the advancement of science and technology, smart products are becoming more and more portable and miniaturized, and batteries capable of being recharged repeatedly are gradually applied to various fields of people's daily life.

The existing battery includes a lower casing, a positive conductive part, a negative conductive part, an electrode assembly and a sealing part, where the electrode assembly is located in the lower casing, the negative conductive part covers an top end of the lower casing, and a middle portion of the negative conductive part is provided with a through hole; the positive conductive part is pasted on an outer surface of the negative conductive part by insulating glue, and a middle portion of the positive conductive part communicates with the inside of the lower casing through the through hole of the negative conductive part. A liquid injection port is arranged on the positive conductive part, and the sealing part is welded on the positive conductive part to seal and cover the liquid injection port.

However, the above-mentioned existing battery has a relatively complicated structure, and there are many manufacturing processes.

SUMMARY

In view of the above problems, embodiments of the present application provide a battery and an electronic device, the battery is relatively simple in structure, and the manufacturing process is simplified.

In order to achieve the above object, a first aspect of the present application provides a battery, including an electrode assembly, a lower casing, a first conductive part and a second conductive part; an opening is provided at a top of the lower casing, and the second conductive part covers the opening of the lower casing, the second conductive part and the lower casing define an accommodating cavity, and the electrode assembly is located in the accommodating cavity; the first conductive part is connected to a side of the second conductive part facing the accommodating cavity, and a sealing layer is provided between the first conductive part and the second conductive part for rendering insulation therebetween; the second conductive part is provided with a through hole, at least part of a structure of the first conductive part is exposed outside of the accommodating cavity through the through hole.

In a possible implementation, the first conductive part includes a body and a protruding portion protruding from a surface of the body, part of an area of the body is connected to a surface of the second conductive part facing the accommodating cavity through the sealing layer, the protruding portion is located in the through hole of the second conductive part, and there is a distance between a side wall of the protruding portion and a hole wall of the through hole.

In a possible implementation, a top end surface of the protruding portion is flush with a top end surface of the second conductive part; or a setting height of the top end surface of the protruding portion relative to a bottom of the battery is higher than a setting height of the top end surface of the second conductive part relative to the bottom of the battery; or the setting height of the top end surface of the protruding portion relative to the bottom of the battery is lower than the setting height of the top end surface of the second conductive part relative to the bottom of the battery.

In a possible implementation, a height difference between the top end surface of the protruding portion and the top end surface of the second conductive part is in a range of −150 μm to 150 μm.

In a possible implementation, the sealing layer includes an isolation portion located between the through hole and the protruding portion, and the isolation portion is clamped between the side wall of the protruding portion and the hole wall of the through hole.

In a possible implementation, a top end surface of the isolation portion is flush with a top end surface of the second conductive part; or a setting height of the top end surface of the isolation portion relative to a bottom of the battery is higher than a setting height of the top end surface of the second conductive part relative to the bottom of the battery; or the setting height of the top end surface of the isolation portion relative to the bottom of the battery is lower than the setting height of the top end surface of the second conductive part relative to the bottom of the battery.

In a possible implementation, a height difference between the top end surface of the isolation portion and the top end surface of the second conductive part is in a range of −100 μm to 100 μm; and/or a thickness of the isolation portion is in a range of 5 μm to 200 μm.

In a possible implementation, the sealing layer is insulating glue.

In a possible implementation, the protruding portion is in a circular table shape.

In a possible implementation, a cross-sectional diameter of the protruding portion is in a range of 10 μm to 2000 μm.

In a possible implementation, both the protruding portion and the body have a thickness ranging from 2 μm to 300 μm.

In a possible implementation, a side surface of the protruding portion is parallel to, or has an included angle with, a thickness direction of the first conductive part; or a connection position between the protruding portion and the body is provided with a rounded corner structure.

In a possible implementation, the lower casing includes a bottom wall and a side wall surrounding an edge of the bottom wall, and a top of the side wall is connected to an edge portion of the second conductive part.

In a possible implementation, the second conductive part has a positioning groove at a near-edge position, the positioning groove is located on a surface of the second conductive part facing the electrode assembly, and a top end of the side wall is connected to the positioning groove.

In a possible implementation, a depth of the positioning groove is in a range of 0.05 mm to 0.1 mm.

In a possible implementation, the positioning groove extends to an edge side surface of the second conductive part, and a first chamfer structure is formed between a groove bottom and a groove wall of the positioning groove, and an angle of the first chamfer structure is in a range of 5° to 90°.

In a possible implementation, a second chamfer structure is provided at a connection position between the side wall and the bottom wall of the lower casing, and a chamfer of the second chamfer structure is in a range of 5° to 90°.

In a possible implementation, the electrode assembly includes a first electrode tab and a second electrode tab, the first electrode tab is electrically connected to the first conductive part, and the second electrode tab is electrically connected to the second conductive part, a positioning mark is provided at an edge position of an outer contour of the first conductive part, and the positioning mark is used to indicate a welding position of the first electrode tab on the first conductive part.

In a possible implementation, there are two positioning marks in number, and the two positioning marks are arranged symmetrically with respect to a center of the first conductive part.

In a possible implementation, the electrode assembly includes a first electrode tab, a second electrode tab, a first electrode piece, a second electrode piece, and an isolation membrane;

the first electrode piece, the isolation membrane, and the second electrode piece are stacked and wound together in sequence, the first electrode tab is electrically connected to the first electrode piece, the second electrode tab is electrically connected to the second electrode piece;

- both a winding head end and a winding tail end of the first electrode piece have an empty foil area, and both a winding head end and a winding tail end of the second electrode piece have an empty foil area;
- the first electrode tab is electrically connected to the empty foil area at the winding tail end of the first electrode piece, and the second electrode tab is electrically connected to the empty foil area at the winding tail end of the second electrode piece.

The second aspect of the present application provides an electronic device, including: an electronic device body and the above-mentioned battery, and the battery provides electric energy for the electronic device body.

In the battery and the electronic device of the present application, the first conductive part is arranged to be connected to the side of the second conductive part facing the accommodating cavity, that is, the first conductive part is connected to a surface of an inner side of the second conductive part, and at the same time, the first conductive part and the second conductive part are connected through the sealing layer. During the use of the battery, if an internal pressure is high, the first conductive part moves upwards under the internal pressure, where the sealing layer between the first conductive part and the second conductive part can play a role in buffering the pressure; at the same time, the part of the first conductive part corresponding to the second conductive part will be blocked by the second conductive part during the rising process, and the second conductive part as a whole will offset part of the pressure on the first conductive part and take the pressure on the first conductive part, so as to avoid problems such as a top cover being ejected during the use of the battery, and improve the internal pressure resistance of the battery.

The structure of the present application as well as its other technical objectives and beneficial effects will be more clearly understood through the description of the embodiments with reference to the accompanying drawings.

REFERENCE NUMBERS

100—battery; 10—electrode assembly; 11—first electrode tab; 12—second electrode tab; 13—first electrode piece; 14—second electrode piece; 15 rolled core; 16 isolation membrane; 20—lower casing; 21—opening; 22—bottom wall; 23—side wall; 30—first conductive part; 31—body; 32—protruding portion; 40—accommodating cavity; 50—second conductive part; 51—through hole; 52—positioning groove; 54—isolation portion; 55—sealing layer main body; 60—sealing layer; 70—positioning mark.

DESCRIPTION OF EMBODIMENTS

In order to make the objects, technical solutions and advantages of the present application clearer, the technical solutions in the embodiments of the present application will be clearly and completely described below with reference to the accompanying drawings in the embodiments of the present application. Obviously, the described embodiments are some, but not all embodiments of the present application. Based on the embodiments of the present application, all other embodiments obtained by those of ordinary skill in the art without making creative efforts belong to the protection scope of the present application.

The existing battery includes a lower casing, a positive conductive part, a negative conductive part, an electrode assembly and a sealing part, there are a large number of parts, and the structure is complex and difficult to manufacture.

The battery and the electronic device according to the embodiments of the present application will be described below with reference to the accompanying drawings. It should be noted that, in the present application, description is made by taking an example where the battery is a button battery. The button battery refers to a battery with the shape and size of a button. Generally, its diameter is relatively large and its thickness is relatively thin. Therefore, the button battery is classified by appearance.

However, the present application is not limited thereto, and other types of batteries are also possible. When the battery is other type of battery, the principle of pressure resistance is similar to this, and will not be repeated here.

Figure 1:
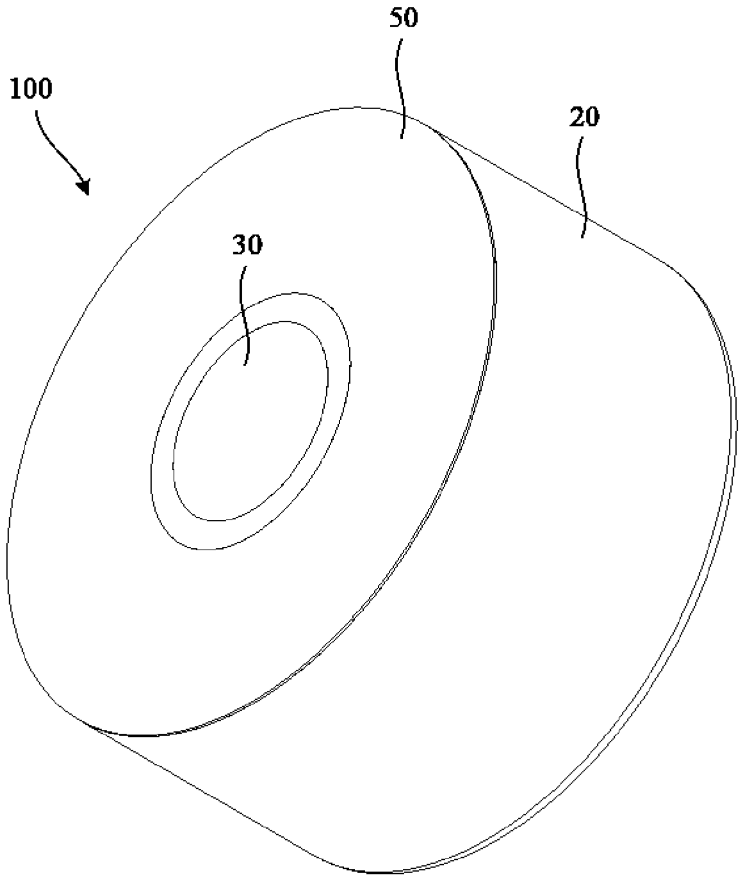
FIG. 1 is a schematic diagram of the overall structure of a battery provided by an embodiment of the present application.
Figure 2:
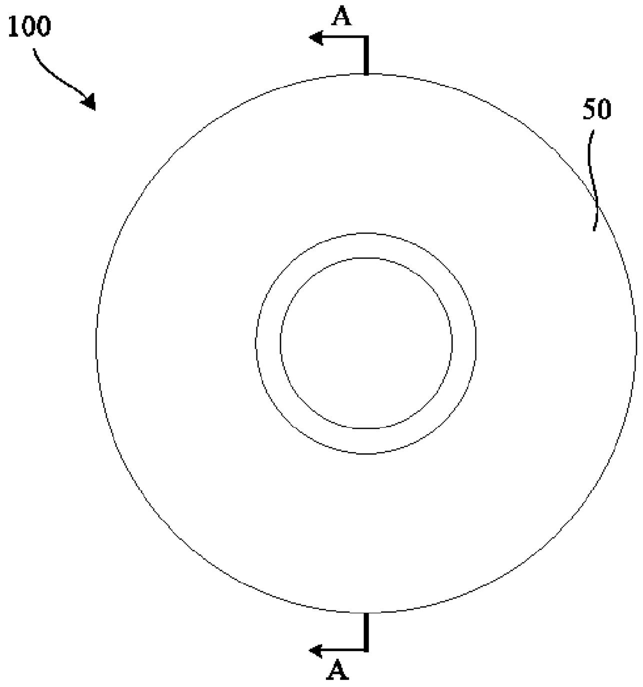
FIG. 2 is a top view of a battery provided by an embodiment of the present application.
Figure 3:
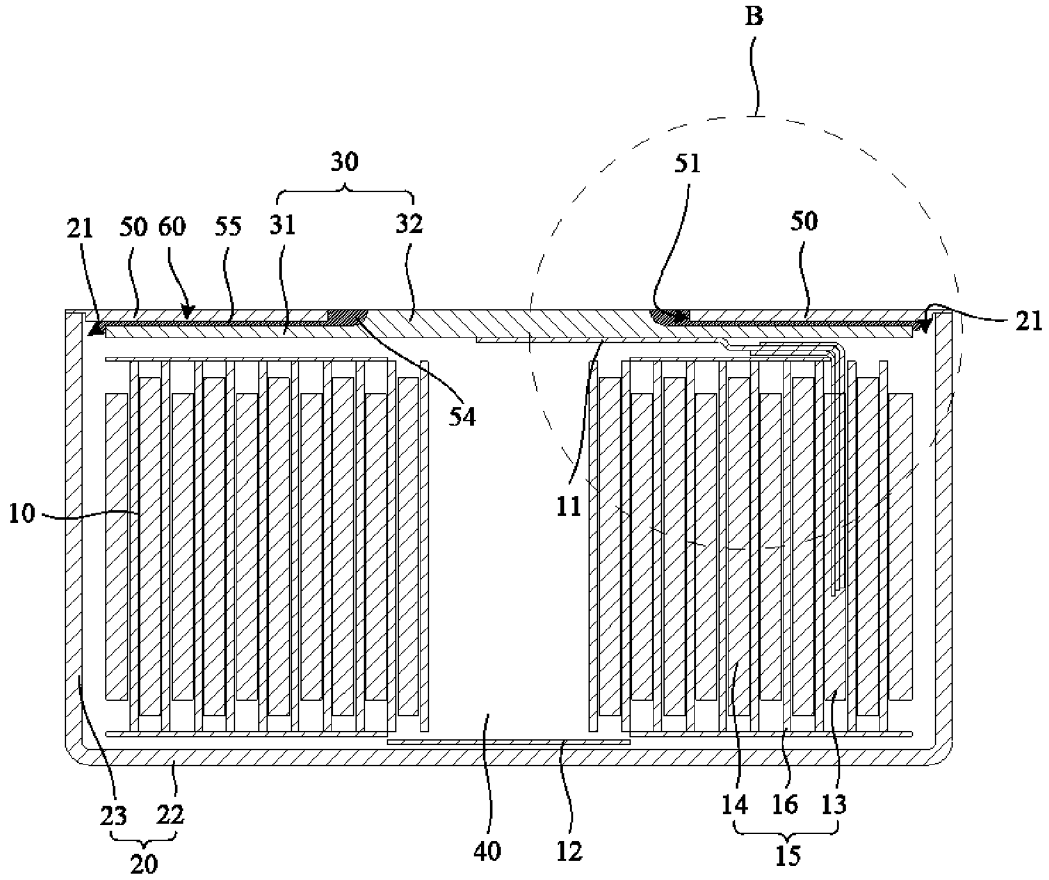
FIG. 3 is a cross-sectional view along line A-A in FIG. 2.
Figure 4:
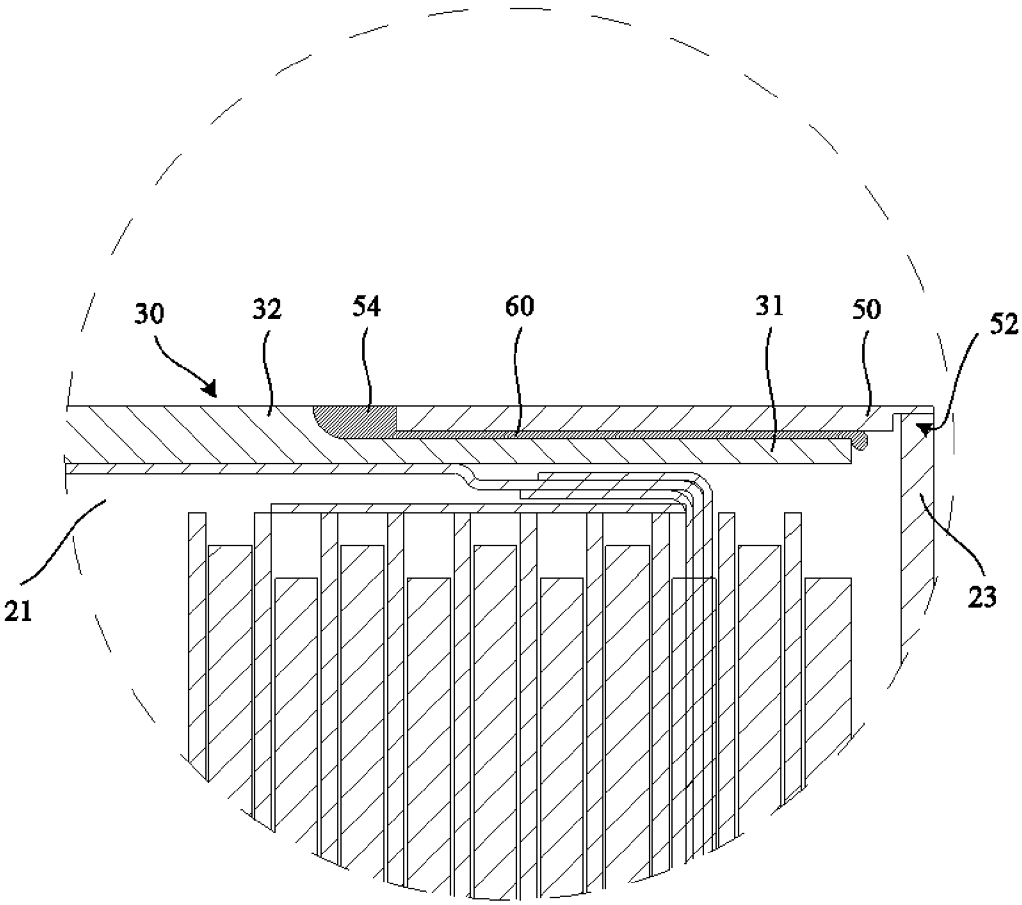
FIG. 4 is a partial enlarged view at position B in FIG. 3.

FIG. 1 is a schematic diagram of the overall structure of a battery provided by an embodiment of the present application, FIG. 2 is a top view of a battery provided by an embodiment of the present application, FIG. 3 is a cross-sectional view along line A-A in FIG. 2, and FIG. 4 is a partial enlarged view at position B in FIG. 3.

Referring to FIG. 1, FIG. 2, FIG. 3, and FIG. 4, the battery 100 of the embodiment of the present application includes an electrode assembly 10, a lower casing 20, a first conductive part 30 and a second conductive part 50, where an opening 21 is provided at a top of the lower casing 20, the second conductive part 50 covers the opening of the lower casing 20, the second conductive part 50 and the lower casing 20 define an accommodating cavity 40, and the electrode assembly 10 is located in the accommodating cavity 40;

the first conductive part 30 is connected to a side of the second conductive part 50 facing the accommodating cavity 40, and a sealing layer 60 is provided between the first conductive part 30 and the second conductive part 50 to render insulation therebetween, and the second conductive part 50 is provided with a through hole 51, and at least part of a structure of the first conductive part 30 is exposed outside of the accommodating cavity 40 through the through hole 51.

In the above solution, the first conductive part 30 is arranged to be connected to the side of the second conductive part 50 facing the accommodating cavity 40, that is, the first conductive part 30 is connected to a surface of an inner side of the second conductive part 50, and at the same time, the first conductive part and the second conductive part are connected through the sealing layer, hence, during the use of the battery 100, if an internal pressure is high, the first conductive part 30 will move upwards under the internal pressure, the sealing layer between the first conductive part and the second conductive part can play a role in buffering the pressure; at the same time, a part of the first conductive part 30 corresponding to the second conductive part 50 will be blocked by the second conductive part 50 during the rising process, and the second conductive part 50 as a whole will offset part of the pressure on the first conductive part and take the pressure on the first conductive part 30, thereby avoiding problems such as a top cover being ejected during the use of the battery, and improving the internal pressure resistance of the battery.

In addition, electrolyte is injected into the lower casing 20 through a gap between the top of the lower casing 20 and the second conductive part. On the one hand, there is no need to additionally provide a liquid injection port on the first conductive part 30 or the second conductive part 50, which is not only simple in structure and easy to manufacture, but also saves the structure of a sealing part compared with the prior art. Therefore, it is unlikely for such a problem that the internal pressure of the battery 100 is applied to the sealing part to cause the sealing part to be easily ejected.

It should be noted that, in the present application, description is made by taking an example where the first conductive part 30 is a positive conductive part and the second conductive part 50 is a negative conductive part, but the present application is not limited thereto. Also, it is possible that the first conductive part 30 is a negative conductive part and the second conductive part 50 is a positive conductive part.

In one embodiment of the present application, referring to FIG. 3, the electrode assembly 10 can include a rolled core 15, a first electrode tab 11 and a second electrode tab 12; the rolled core 15 includes a first electrode piece 13, a second electrode piece 14, and an isolation membrane 16, etc. Specifically, the rolled core 15 can be a cylindrical winding body and be arranged in the accommodating cavity 40, and the electrolyte is also accommodated in the accommodating cavity 40 at the same time, the first electrode piece 13 and the second electrode piece 14 are separated by the isolation membrane 16 and are rolled together.

In this embodiment, the first electrode piece 13 is electrically connected with the first electrode tab 11, and the second electrode piece 14 is electrically connected with the second electrode tab 12. The first electrode tab 11 and the second electrode tab 12 can be respectively drawn out from either end sides of the rolled core 15. Specifically, both a winding head end and a winding tail end of the first electrode piece 13 have an empty foil area, both a winding head end and a winding tail end of the second electrode piece 14 have an empty foil area, and the first electrode tab 11 is electrically connected to the empty foil area at the winding tail end of the first electrode piece 13, and the second electrode tab 12 is electrically connected to the empty foil area at the winding tail end of the second electrode piece 14.

Of course, the present application is not limited thereto. In some embodiments of the present application, a connection position of the first electrode tab 11 on the first electrode piece 13 can also be other positions, and a connection position of the second electrode tab 12 on the second electrode piece 14 can also be other positions. In still some specific embodiments, the winding head end of the first electrode piece does not have the empty foil area, the winding head end of the second electrode piece does not have the empty foil area.

In addition, the second electrode tab 12 is connected to the lower casing 20, and the lower casing 20 is electrically connected to the second conductive part 50, so the second electrode tab 12 is electrically connected to the second conductive part 50, and the first conductive part 30 is electrically connected to the first electrode tab 11 directly.

In the embodiment of the present application, the lower casing 20 may be a metal casing, and the cross-sectional shape of the lower casing 20 is not limited to a circle, but may also be an ellipse, a polygon, and the like.

Exemplarily, referring to FIG. 3, the lower casing 20 includes a bottom wall 22 and a side wall 23 surrounding an edge of the bottom wall 22, so that the lower casing 20 forms a hood shape part. In the embodiment of the present application, before the lower casing 20 is connected to and fixed with the second the conductive part 50, the gap between the top of the lower casing 20 and the second conductive part 50 is used as a liquid injection port, that is, the electrolyte is injected into the accommodating cavity 40 through the gap between the top of the lower casing 20 and the second conductive part 50.

In addition, a second chamfer structure may be provided at a connection position between the side wall 23 and the bottom wall 22 of the lower casing, and an angle of the second chamfer structure may be in a range of 5° to 90°.

Referring to FIG. 3 and FIG. 4, the second conductive part 50 can cover the opening 21 of the lower casing 20, the second conductive part 50 and the lower casing 20 can define the accommodating cavity 40, and the above-mentioned electrode assembly 10 can be arranged in the accommodating cavity 40. A top end portion of the side wall 23 may be connected to an edge portion of the second conductive part 50. For example, the edge portion of the second conductive part 50 may be connected to the top end portion of the side wall 23 by laser welding. In this way, the second conductive part 50 is actually connected to the opening 21 of the lower casing 20. In addition, a chamfer may also be provided at a connection position between the second conductive part 50 and the lower casing 20, and the chamfer may have an angle of 5° to 90°.

Of course, in order to facilitate the welding of the second conductive part 50 and the side wall 23, in a specific embodiment, the edge of the second conductive part 50 is thinned, for example, referring to FIG. 4, a positioning groove 52 is formed on the second conductive part 50 at a near-edge position, the positioning groove 52 is located on a surface of the second conductive part 50 facing the electrode assembly, the top end of the side wall 23 can be connected in the positioning groove 52, the positioning groove 52 corresponds to the top end portion of the side wall 23, thus the positioning groove 52 is formed as an annular structure. Exemplarily, the positioning groove 52 may have a depth of 0.05 mm to 0.1 mm.

As a possible implementation, the positioning groove 52 extends to an edge side surface of the second conductive part 50, a first chamfer structure is formed between the groove bottom and the groove wall of the positioning groove 52, and an angle of the first chamfer structure is in a range of 5° to 90°.

In the embodiment of the present application, the second conductive part 50 is provided with a through hole 51, and the first conductive part 30 is connected to the side of the second conductive part 50 facing the accommodating cavity 40. It should be noted that a sealing layer 60 is provided between the first conductive part 30 and the second the conductive part 50 to insulate them, which can prevent the electrolyte from leaking out of the battery 100. Here, the sealing layer 60 may be insulating glue, and the sealing layer 60 may have a thickness of 5 μm to 200 μm.

In this way, at least part of the structure of the first conductive part 30 is exposed outside of the accommodating cavity 40 through the through hole 51. Referring to FIG. 1, viewed from the entire exteriority of the battery 100, the lower casing 20 and the second conductive part 50 are a second electrode of the battery 100, such as a negative electrode; a portion of the first conductive part 30 exposed outside of the through hole 51 forms a first electrode of the battery 100, such as a positive electrode. Because part of the structure of the first conductive part 30 is exposed outside of the battery 100 through the through hole 51, both the first electrode and the second electrode of the battery 100 can be arranged on the top side of the battery 100.

In the embodiment of the present application, in order to facilitate the connection between the first conductive part 30 and external components, such as conductive sheets, a protruding structure may be provided on the top of the first conductive part 30.

Exemplarily, referring to FIG. 3 and FIG. 4, the first conductive part 30 includes a body 31 and a protruding portion 32 protruding from a surface of the body 31, and part of an area of the body 31 is connected to a surface of the second conductive part 50 facing the accommodating cavity 40 through the sealing layer 60, the protruding portion 32 is located in the through hole 51 of the second conductive part 50, so that the protruding portion 32 can be exposed outside of the battery 100 through the through hole 51. Here, it should be noted that there may be a distance between a side wall 23 of the protruding portion 32 and a hole wall of the through hole 51, to avoid a mutual contact between the protruding portion 32 and the through hole 51 and an occurrence of short circuit.

Certainly, the sealing layer 60 includes a sealing layer main body 55 and an isolation portion 54 located between the through hole and the protruding portion 32, and the sealing layer main body 55 is clamped between the first conductive part 30 and the second conductive part 50. Specifically, the sealing layer main body 55 is located between radial surfaces of the first conductive part 30 and the second conductive part 50. The isolation portion 54 is clamped between the side wall 23 of the protruding portion 32 and the hole wall of the through hole. In the case where both the sealing layer main body 55 and the isolation portion 54 are insulating glue, the sealing layer main body 55 and the isolation portion 54 can be integrally formed. For example, when the first conductive part 30 and the second conductive part 50 are provided with insulating glue, the portion of the insulating glue between the radial surfaces of the first conductive part 30 and the second conductive part 50 forms the sealing layer main body 55, and surplus insulating glue can overflow towards the gap between the protruding portion 32 and the through hole 51, to form the isolation portion 54. That is, the sealing layer main body 55 and the isolation portion 54 may be insulating glue with the same composition.

In another specific embodiment, the isolation portion and the sealing layer main body 55 may be insulating glue with different compositions.

In the above solution, the isolation portion is set to be located between the protruding portion 32 and the hole wall of the through hole, gluing areas of the first conductive part 30 and the second conductive part 50 are increased, and the stability of the first conductive part 30 and the second conductive part 50 is improved, meanwhile, the isolation portion 54 can effectively buffer the internal pressure in a width direction of the battery, preventing the first conductive part 30 from moving leftwards and rightwards, and preventing the protruding portion and the through hole from contacting each other to cause a short circuit.

In an implementation, a top end surface of the isolation portion 54 is flush with a top end surface of the second conductive part 50; or a setting height of the top end surface of the isolation portion 54 relative to a bottom of the battery 100 is higher than a setting height of the top end surface of the second conductive part 50 relative to the bottom of the battery 100; or, the setting height of the top end surface of the isolation portion 54 relative to the bottom of the battery 100 is lower than the setting height of the top end surface of the second conductive part 50 relative to the bottom of the battery 100. For example, a height difference between the top end surface of the isolation portion 54 and the top end surface of the second conductive part 50 may be in a range of −100 μm to 100 μm. In addition, the isolation portion 54 may have a thickness of 5 μm to 200 μm.

In the embodiment of the present application, referring to FIG. 4, a top end surface of the protruding portion 32 is flush with the top end surface of the second conductive part 50; or the setting height of the top end surface of the protruding portion 32 relative to the bottom of the battery 100 is higher than the setting height of the top end surface of the first conductive part 30 relative to the bottom of the battery 100. Alternatively, the setting height of the top end surface of the protruding portion 32 relative to the bottom of the battery 100 may be lower than the setting height of the top end surface of the first conductive part 30 relative to the bottom of the battery 100.

Exemplarily, a height difference between the top end surface of the protruding portion 32 and the top end surface of the second conductive part is in a range of −150 μm to 150 μm.

In addition, the protruding portion 32 can be a solid of revolution, for example, in a circular table shape, and the shape of the body 31 can also be a circular table shape, the present application is not limited thereto. The protruding portion 32 may also be set in other shapes. When the protruding portion 32 is a circular table, a cross-sectional diameter of the protruding portion 32 is in a range of 10 μm to 2000 μm. In addition, at a connection position between the protruding portion 32 and the body 31, a chamfer can be provided, and the outer side wall 23 of the protruding portion 32 can be parallel to a thickness direction of the battery 100 (thickness direction of the first conductive part), or have an included angle relative to the thickness direction of the battery 100, that is, it is inclined relative to the thickness direction of the battery 100. Alternatively, a connection position between the protruding portion 32 and the body 31 is provided with a rounded corner structure.

Both the protruding portion 32 and the body may have a thickness of 2 μm to 300 μm.

Figure 5:
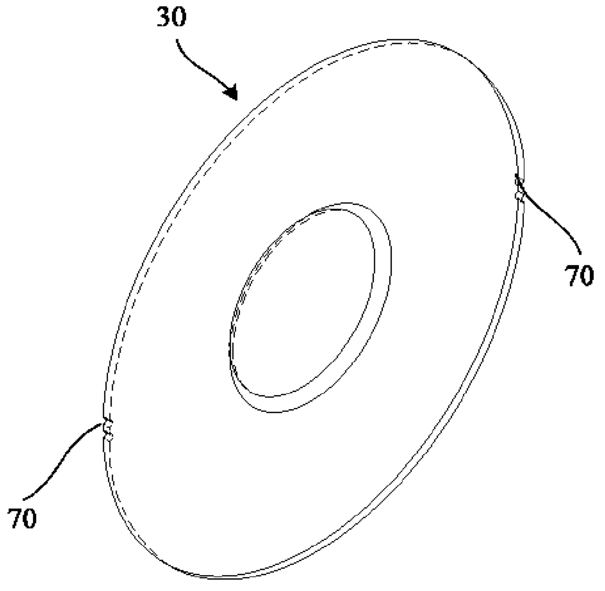
FIG. 5 is a schematic structural diagram of the first conductive part in the battery provided by the embodiment of the present application.

FIG. 5 is a schematic structural diagram of the first conductive part in the battery provided by an embodiment of the present application.

Referring to FIG. 5, a positioning mark 70 is provided at an edge position of an outer contour of the first conductive part 30, and the positioning mark 70 is used to indicate a welding position of the first electrode tab on the first conductive part 30. The positioning mark 70 can be at least one notch, and the shape of the notch can be selected according to actual needs, for example, it can be a polygon, a circle, or the like.

As a possible implementation, there are two positioning marks 70 in number, and the two positioning marks 70 are arranged symmetrically with respect to a center of the first conductive part 30.

In the embodiment of the present application, as mentioned above, the rolled core 15 includes the first electrode piece 13 and the second electrode piece 14. The first electrode piece 13 includes a first current collector and a first active material disposed on a corresponding surface of the first current collector, and the second electrode piece 14 includes a second current collector and a second active material disposed on a corresponding surface of the second current collector.

Exemplarily, the first active material is used as an active material capable of intercalating and de-intercalating lithium. For example, a lithium-containing compound such as lithium oxide, lithium phosphorus oxide, lithium sulfide, or an interlayer compound containing lithium can be selected, and a lithium metal composite oxide can be exemplified.

Metal elements constituting the lithium metal composite oxide are, for example, selected from at least one of Mg, Al, Ca, Sc, Ti, V, Cr, Mn, Fe, Co, Ni, Cu, Zn, Ga, Ge, Y, Zr, Sn, Sb, W, Pb and Bi. Among them, it can be selected from at least one of Co, Ni, Mn and Al. As a proper example of the lithium metal composite oxide, a lithium metal composite oxide containing Co, Ni and Mn, and a lithium metal composite oxide containing Co, Ni and Al can be enumerated.

Second active material: as long as it is a material capable of storing and releasing lithium ions. Examples thereof include carbon materials, lithium metal, metals capable of forming an alloy with lithium or alloy compounds containing the metals, etc. As the carbon material, graphites such as natural graphite, non-graphitizable carbon and artificial graphite, and cokes can be used. The alloy compound, enumeration can be made to include at least one metal that can form an alloy with lithium. As an element capable of forming an alloy with lithium, silicon and tin can be used, and silicon oxide, tin oxide, and the like bonded to oxygen can also be used. In addition, a mixture of the above-mentioned carbon material with a silicon or a tin compound can be used. In addition to the above, one having a higher charging and discharging potential, with respect to metal lithium such as lithium titanate, than carbon materials and the like may be used.

Electrolyte: nonaqueous electrolyte contains a nonaqueous solvent and an electrolyte salt dissolved in the nonaqueous solvent. The nonaqueous electrolyte is not limited to liquid electrolyte (a nonaqueous electrolytic solution), and may be solid electrolyte using a gel polymer or the like. The electrolyte can be a mixed organic solvent selected from at least one of the following: propylene carbonate (PC), ethylene carbonate (EC), diethylester carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone (GBL), fluoroethylene carbonate (FEC), methyl formate, ethyl formate, propyl formate, methyl acetate, ethyl acetate, propyl acetate, amyl acetate, methyl propionate, ethyl propionate and butyl propionate. In addition, the electrolytic solution according to the present application may also contain a lithium salt, and the anion of the lithium salt may be selected from at least one of the following: $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH$, $(SF_5)_3C^-$, $(CF_3SO_2)_3C^-$, $CF_3(CF_2)_{7503}$, $CF_3CO_2^-$, $CH_3CO_2^-$, $SCN^-$ and $(CF_3CF_2SO_2)_2N^-$.

The following describes the assembly process of the battery 100 of the present application.

Step 1: first, bending the first electrode tab 11, and connecting one end of the first electrode tab 11 to a corresponding electrode piece of the rolled core 15; it should be noted that after the first electrode tab 11 is bent, the other end of the first electrode tab 11 should remain parallel to the end surface of the rolled core 15;

bending the second electrode tab 12, and connecting one end of the second electrode tab 12 to a corresponding electrode piece of the rolled core 15; it should be noted that after the second electrode tab 12 is bent, the other end of the second electrode tab 12 should remain parallel to the end surface of the rolled core 15.

Step 2: placing the rolled core 15, connected with the first electrode tab 11 and the second electrode tab 12, inside the accommodating cavity 40, and welding the second electrode tab 12 with the lower casing 20 by laser welding or resistance welding; and welding the first electrode tab 11 with the first conductive part 30 by laser welding or resistance welding.

Step 3: Coating insulating glue between the second conductive part 50 and the first conductive part 30 to bond them together, and then putting the resultant into an oven for baking.

Step 4: placing the securely bonded first conductive part 30 and second conductive part 50 on the lower casing, and injecting the electrolyte into the lower casing 20 through the gap between the second conductive part 50 and the lower casing, and welding the second conductive part 50 on the lower casing 20 by laser welding or resistance welding to complete the assembly of the battery 100.

Step 5: carrying out an electrical performance test on the above-mentioned battery 100.

In embodiments of the present application, first, the first conductive part 30 and the second conductive part 50 are secured together by bonding through insulating glue and baking; then, they are placed on the lower casing 20 correspondingly with the gap between the lower casing 20 and the second conductive part 50 being used as a liquid injection port, and the electrolyte is injected into the lower casing 20 through the gap between the second conductive part 50 and the lower casing 20; and after that, the second conductive part 50 and the lower casing 20 are fixed by welding. On the one hand, there is no need to additionally set a liquid injection port on the first conductive part 30 or the second conductive part 50, which not only simplifies the structure of the first conductive part 30 and the second conductive part 50, but also makes it easy to manufacture; on the other hand, compared with the prior art, there is no need to use the sealing part to seal and cover the liquid injection port, which saves the material cost of the sealing part, and simplifies the manufacturing process. Therefore, it is unlikely for such a problem that the internal pressure of the battery 100 is exerted on the sealing part to cause the sealing part to be easily ejected.

The present application also provides an electronic device, including: an electronic device body and the above-mentioned battery 100, and the battery 100 provides electric energy for the electronic device body.

The structure of the battery in the electronic device provided by the present application is the same as that of the above-mentioned battery, and can bring about the same or similar technical effects, which will not be repeated here.

In the description of the present application, it should be noted that unless otherwise specified and limited, the term "installation", "connecting with" or "connection" should be understood in a broad sense, for example, it can be a fixed connected, or it can be an indirect connection through an intermediate medium, which can be an internal communication of two elements or an interaction relationship between two elements. Those of ordinary skill in the art can understand the specific meanings of the above terms in the present application according to specific situations.

In describing the present application, it is to be understood that the orientation or positional relationship indicated by terms "upper", "lower", "front", "rear", "vertical", "horizontal", "top", "bottom", "inner" and "outer" etc., is based on the orientation or positional relationship shown in the drawings, and is only for the convenience of describing the present application and simplifying the description, rather than indicating or implying that the referred apparatus or element must have a specific orientation, or constructed and operative in a particular orientation and therefore are not to be construed as limitations of the present application.

The terms "first", "second", "third", "fourth", etc. (if existed) in the specification and claims of the present application and the above drawings are used to distinguish similar objects, and not necessarily used to describe a specific order or sequence. It should be understood that the data so used are interchangeable under appropriate circumstances such that the embodiments of the application described herein, for example, can be practiced in sequences other than those illustrated in the figures or described herein.

Furthermore, the terms "including" and "having", as well as any variations thereof, are intended to cover a non-exclusive inclusion, for example, a process, method, system, product or device including a sequence of steps or elements is not necessarily limited to the expressly listed, instead, may include other steps or elements not explicitly listed or inherent to the process, method, product or device.

Finally, it should be noted that: the above embodiments are only used to illustrate the technical solutions of the present application, rather than limiting them. Although the present application has been described in detail with reference to the foregoing embodiments, those of ordinary skill in the art should understand that: it is still possible to modify the technical solutions described in the foregoing embodiments, or perform equivalent replacements for some or all of the technical features; and these modifications or replacements do not make the essence of the corresponding technical solutions deviate from scope of the technical solutions of the various embodiments of the present application.

What is claimed is:

1. A battery, comprising an electrode assembly, a lower casing, a first conductive part and a second conductive part; wherein an opening is provided at a top of the lower casing, the second conductive part covers the opening of the lower casing, the second conductive part and the lower casing define an accommodating cavity, and the electrode assembly is located in the accommodating cavity;

the first conductive part is connected to a side of the second conductive part facing the accommodating cavity, and a sealing layer is provided between the first conductive part and the second conductive part, the sealing layer rendering insulation between the first conductive part and the second conductive part; the second conductive part is provided with a through hole, at least part of a structure of the first conductive part is exposed outside of the accommodating cavity through the through hole;

wherein the electrode assembly comprises a first electrode tab, a second electrode tab, a first electrode piece, a second electrode piece and an isolation membrane;

the first electrode piece, the isolation membrane, and the second electrode piece are stacked and wound together in sequence, the first electrode tab is electrically connected to the first electrode piece, and second electrode tab is electrically connected to the second electrode piece;

both a winding head end and a winding tail end of the first electrode piece have an empty foil area, and both a winding head end and a winding tail end of the second electrode piece have an empty foil area; and the first electrode tab is electrically connected to the empty foil area at the winding tail end of the first electrode piece, and the second electrode tab is electrically connected to the empty foil area at the winding tail end of the second electrode piece.

2. The battery according to claim 1, wherein the first conductive part comprises a body and a protruding portion protruding from a surface of the body, and part of an area of the body is connected to a surface of the second conductive part facing the accommodating cavity through the sealing layer, the protruding portion is located in the through hole of the second conductive part, and there is a distance between a side wall of the protruding portion and a hole wall of the through hole.

3. The battery according to claim 2, wherein a top end surface of the protruding portion is flush with a top end surface of the second conductive part; or a setting height of the top end surface of the protruding portion relative to a bottom of the battery is higher than a setting height of the top end surface of the second conductive part relative to the bottom of the battery; or the setting height of the top end surface of the protruding portion relative to the bottom of the battery is lower than the setting height of the top end surface of the second conductive part relative to the bottom of the battery.

4. The battery according to claim 3, wherein a height difference between the top end surface of the protruding portion and the top end surface of the second conductive part is in a range of −150 μm to 150 μm.

5. The battery according to claim 2, wherein the sealing layer comprises an isolation portion located between the through hole and the protruding portion, and the isolation portion is clamped between the side wall of the protruding portion and the hole wall of the through hole.

6. The battery according to claim 5, wherein a top end surface of the isolation portion is flush with a top end surface of the second conductive part; or a setting height of the top end surface of the isolation portion relative to a bottom of the battery is higher than a setting height of the top end surface of the second conductive part relative to the bottom of the battery; or the setting height of the top end surface of the isolation portion relative to the bottom of the battery is lower than the setting height of the top end surface of the second conductive part relative to the bottom of the battery.

7. The battery according to claim 6, wherein a height difference between the top end surface of the isolation portion and the top end surface of the second conductive part is in a range of −100 μm to 100 μm; and/or a thickness of the isolation portion is in a range of 5 μm to 200 μm.

8. The battery according to claim 1, wherein the sealing layer is insulating glue.

9. The battery according to claim 2, wherein the protruding portion is in a circular table shape; and a cross-sectional diameter of the protruding portion is in a range of 10 μm to 2000 μm.

10. The battery according to claim 2, wherein both the protruding portion and the body have a thickness ranging from 2 μm to 300 μm.

11. The battery according to claim 2, wherein a side surface of the protruding portion is parallel to, or has an included angle with, a thickness direction of the first conductive part; or a connection position between the protruding portion and the body is provided with a rounded corner structure.

12. The battery according to claim 1, wherein the lower casing comprises a bottom wall and a side wall surrounding an edge of the bottom wall, and a top end of the side wall is connected to an edge portion of the second conductive part.

13. The battery according to claim 12, wherein the second conductive part has a positioning groove at a near-edge position, the positioning groove is located on a surface of the second conductive part facing the electrode assembly, and the top end of the side wall is connected to the positioning groove.

14. The battery according to claim 13, wherein a depth of the positioning groove is in a range of 0.05 mm to 0.1 mm.

15. The battery according to claim 13, wherein the positioning groove extends to an edge side surface of the second conductive part, a first chamfer structure is formed between a groove bottom and a groove wall of the positioning groove, and an angle of the first chamfer structure is in a range of 5° to 90°.

16. The battery according to claim 12, wherein a second chamfer structure is provided at a connection position between the side wall and the bottom wall of the lower casing, and an angle of the second chamfer structure is in a range of 5° to 90°.

17. The battery according to claim 1, wherein the electrode assembly comprises a first electrode tab and a second electrode tab, the first electrode tab is electrically connected to the first conductive part, and the second electrode tab is electrically connected to the second conductive part;

a positioning mark is provided at an edge position of an outer contour of the first conductive part, and the positioning mark is used to indicate a welding position of the first electrode tab on the first conductive part; and wherein there are two positioning marks in number, and the two positioning marks are arranged symmetrically with respect to a center of the first conductive part.

18. The battery according to claim 1, wherein the sealing layer has a thickness of 5 μm to 200 μm.

19. An electronic device, comprising: an electronic device body and the battery according to claim 1, the battery providing electric energy for the electronic device body.

* * * * *